C. A. PETTIT.
PHONOGRAPH.
APPLICATION FILED MAR. 24, 1920.

1,377,027. Patented May 3, 1921.
6 SHEETS—SHEET 3.

WITNESSES

INVENTOR
Charles A. Pettit
BY
ATTORNEYS

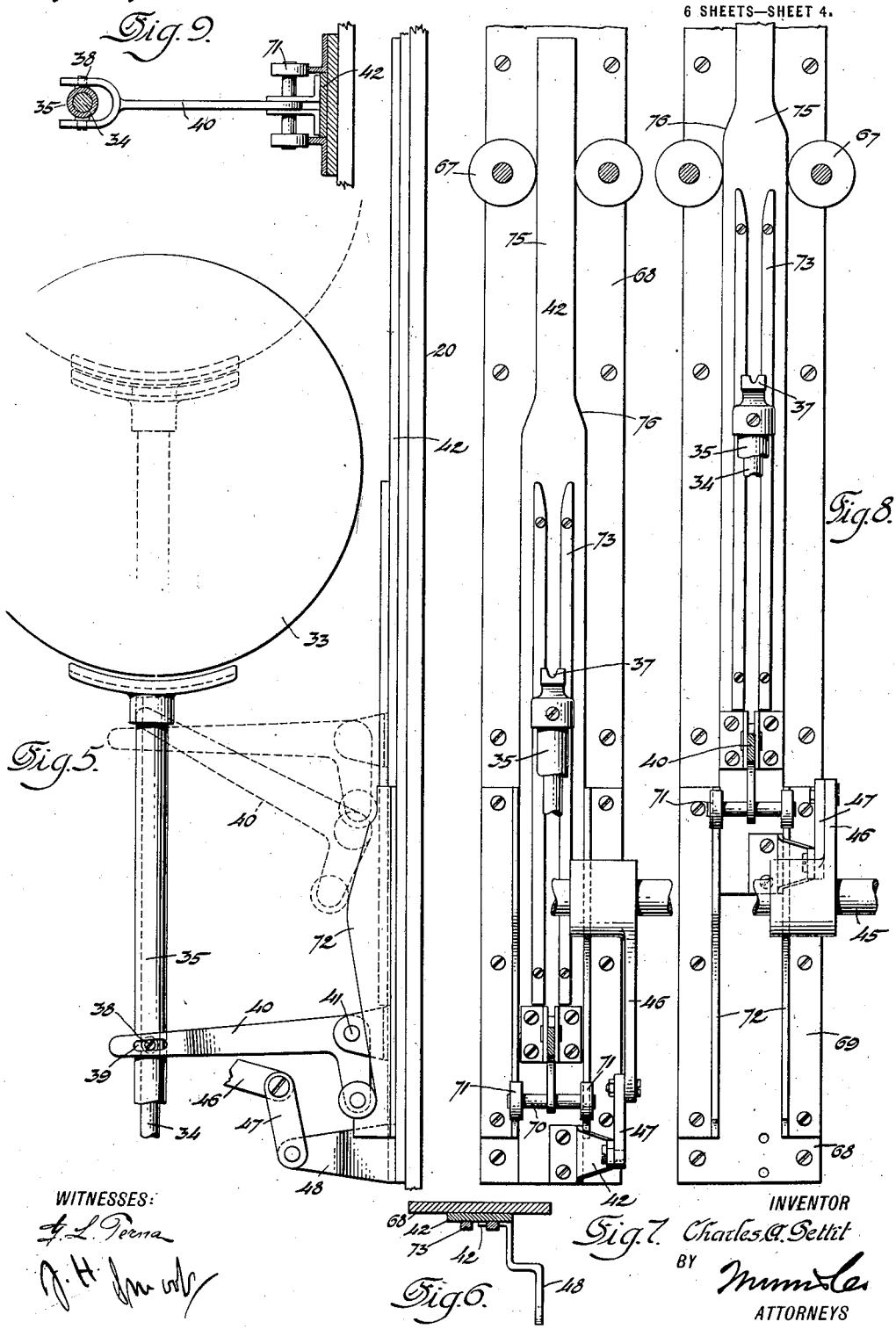

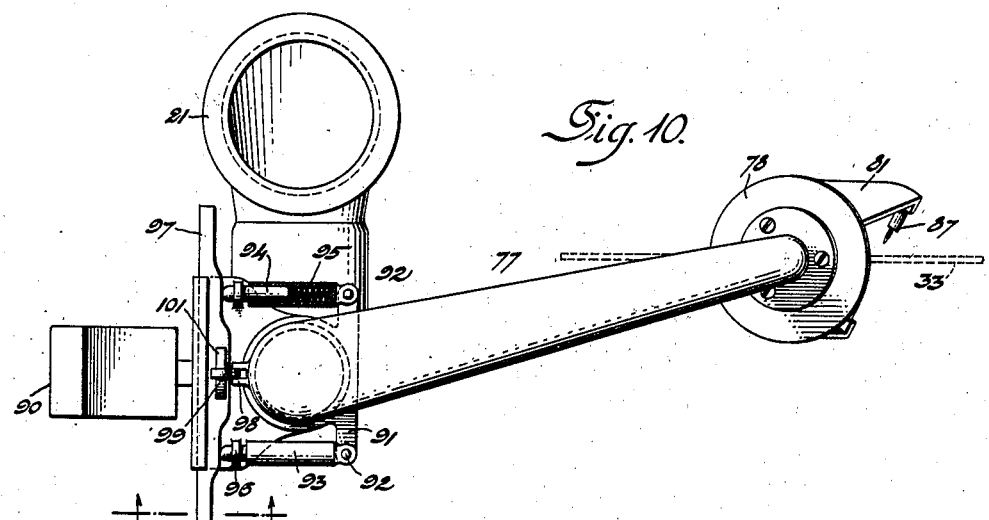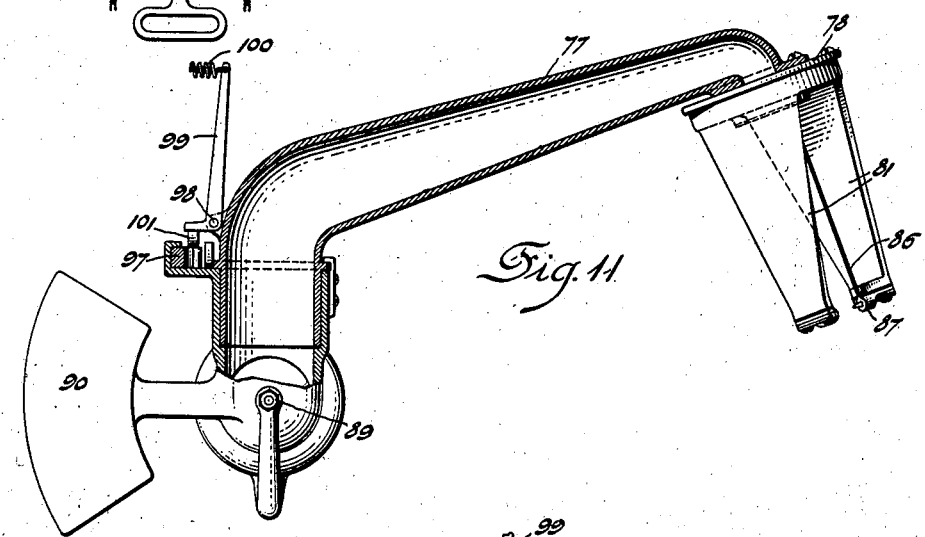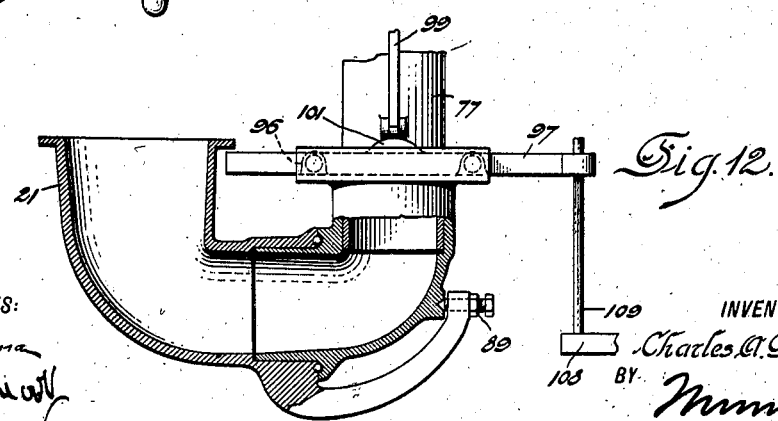

C. A. PETTIT.
PHONOGRAPH.
APPLICATION FILED MAR. 24, 1920.

1,377,027.

Patented May 3, 1921.
6 SHEETS—SHEET 6.

WITNESSES:

INVENTOR
Charles A. Pettit
BY
ATTORNEYS

UNITED STATES PATENT OFFICE.

CHARLES ALFRED PETTIT, OF ST. LOUIS, MISSOURI.

PHONOGRAPH.

1,377,027.   Specification of Letters Patent.   Patented May 3, 1921.

Application filed March 24, 1920. Serial No. 368,478.

*To all whom it may concern:*

Be it known that I, CHARLES A. PETTIT, a citizen of the United States, and a resident of St. Louis in the State of Missouri, have invented a new and Improved Phonograph, of which the following is a full, clear, and exact description.

This invention relates to a phonograph and aims to provide a device of this character more particularly known as a magazine phonograph.

An object of this invention is the operation of a phonograph of this type which shall be capable of providing a receiving compartment or magazine, adapted to accommodate an almost unlimited number of records.

A still further object of my invention is the construction of a phonograph in which any record may be instantly available for reproduction, and in which it will not be necessary for the operator to handle any of the records, properly position the reproducer upon the face of the record, etc.

I aim to provide a phonograph of the type specified which shall permit of the objects set forth in the foregoing paragraphs upon the actuating of an extremely small number of actuating parts, the same setting in operation the mechanism by means of which reproduction is effected. By means of the extremely few number of actuating parts employed it will be possible for any one to efficiently operate the phonograph.

Reference is had to the attached sheets of drawings illustrating one practical embodiment of my invention, and in these drawings, Figure 1 is a sectional side view through a cabinet housing a magazine phonograph constructed in accordance with my invention.

Figs. 5, 6, 7, 8 and 9 illustrate enlarged details of the selective mechanism adapted to coöperate with the magazine for removing the record to be played therefrom.

Figs. 10, 11, and 12 show the tone arm connection employed.

Figure 13:
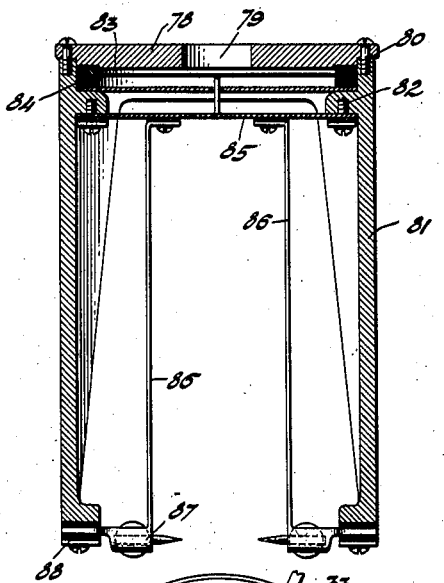
Figure 14:
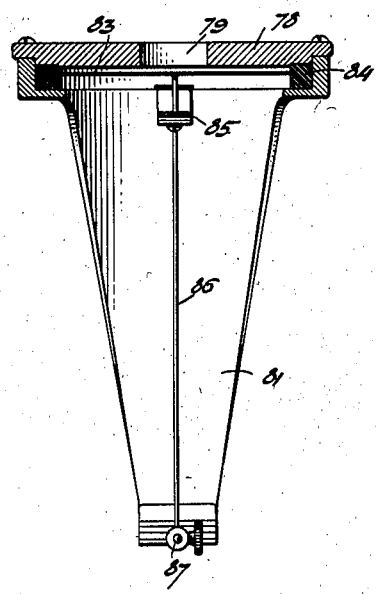
Figure 15:
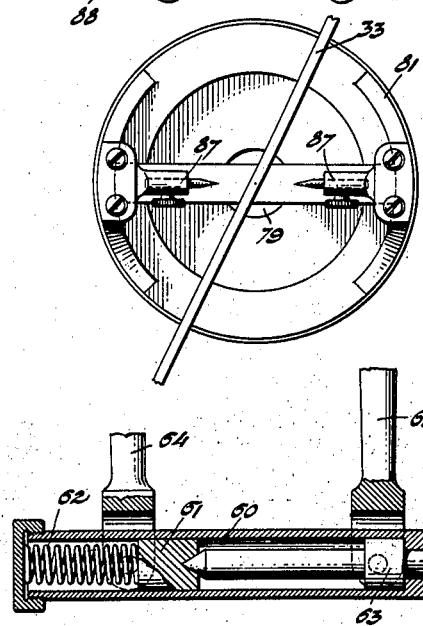
Figure 16:
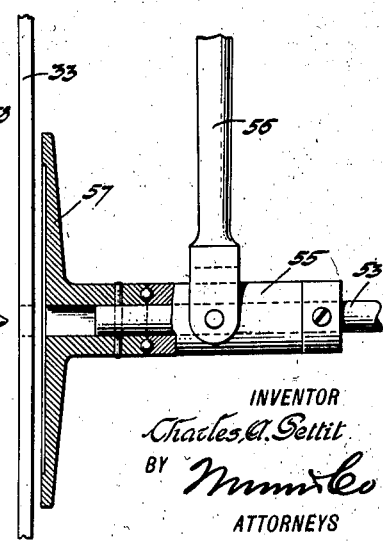

Figs. 13, 14 and 15 illustrate the preferred form of reproducer to be associated with such tone arm, and Fig. 16 discloses a detail of the record receiving and holding apparatus.

In all these views like reference numerals designate similar parts, and the reference numeral 20 indicates a conventional cabinet of any desired construction which has associated with it the usual horn 21 serving as an amplifier for the tone waves transmitted to the reproducer.

Conveniently positioned centrally within the cabinet is a base, such as 22 provided in its upper face with a socket adapted to receive the end of a rotatably mounted rod 23, positive rotation being imparted to this rod by any suitable means such as a crank 24 attached to its upper end, which end projects through the deck of the cabinet 20.

With a view of providing means indicating the position of the rod 23, and holding the same in any desired affixed position, I associate with the outer end of the crank 24 a spring pressed plunger 25, which plunger projects through the crank 24 and travels through a circle in which the lower end of the plunger 25 alines with openings or depressions 26 in the face of the deck of the cabinet 20. Now, to provide indicating means, the upper face of the deck of the cabinet has imprinted or otherwise affixed to it a scale 27 subdivided into a number of divisions, as desired, and the end of the crank arm 24 permits, as has been indicated at 28 in the pointer fingers overlying the scale 27.

It will now be understood that the rod 23 may be rotated by retracting the plunger 25 and swinging the crank arm 24. The rod 23 may also be retained in any desired affixed position by permitting the pointer 28 to aline within such division desired upon the scale 27 and releasing the plunger 25, which will then engage one of the openings or depressions 26 and prevent any relative movement of the rod 23 with respect to the cabinet 20.

The rod 23 has a hub 29 affixed to it by any suitable means such as a pin extending transversely through both of these members. The hub mounts a magazine, including a pair of annular bands 30 held in spaced relation by any suitable means such as the radially extending arms 30', the outer ends of which are affixed to the inner face of the outermost band 30. These bands have their lower ends curved one toward the other as at 31, in Figs. 1 and 2. The inner faces of both of the bands 30 are formed with grooves 32 extending in a vertical plane and which provide individual pockets for receiving records 33.

Now with a view of providing mechanism which will permit the withdrawal of any one of the records positioned within the magazine, I mount upon the upper face of the floor of the cabinet, the lower end of a rod such as 34 which is encircled by a sleeve 35, slidably mounted thereon. The upper end of the sleeve 35 carries a shoe 36 curved longitudinally to conform to the curve of the outer edge of a record, and provided with a seat comprising a notch 37 which prevents any movement of the record with respect to the said shoe.

Figure 1:
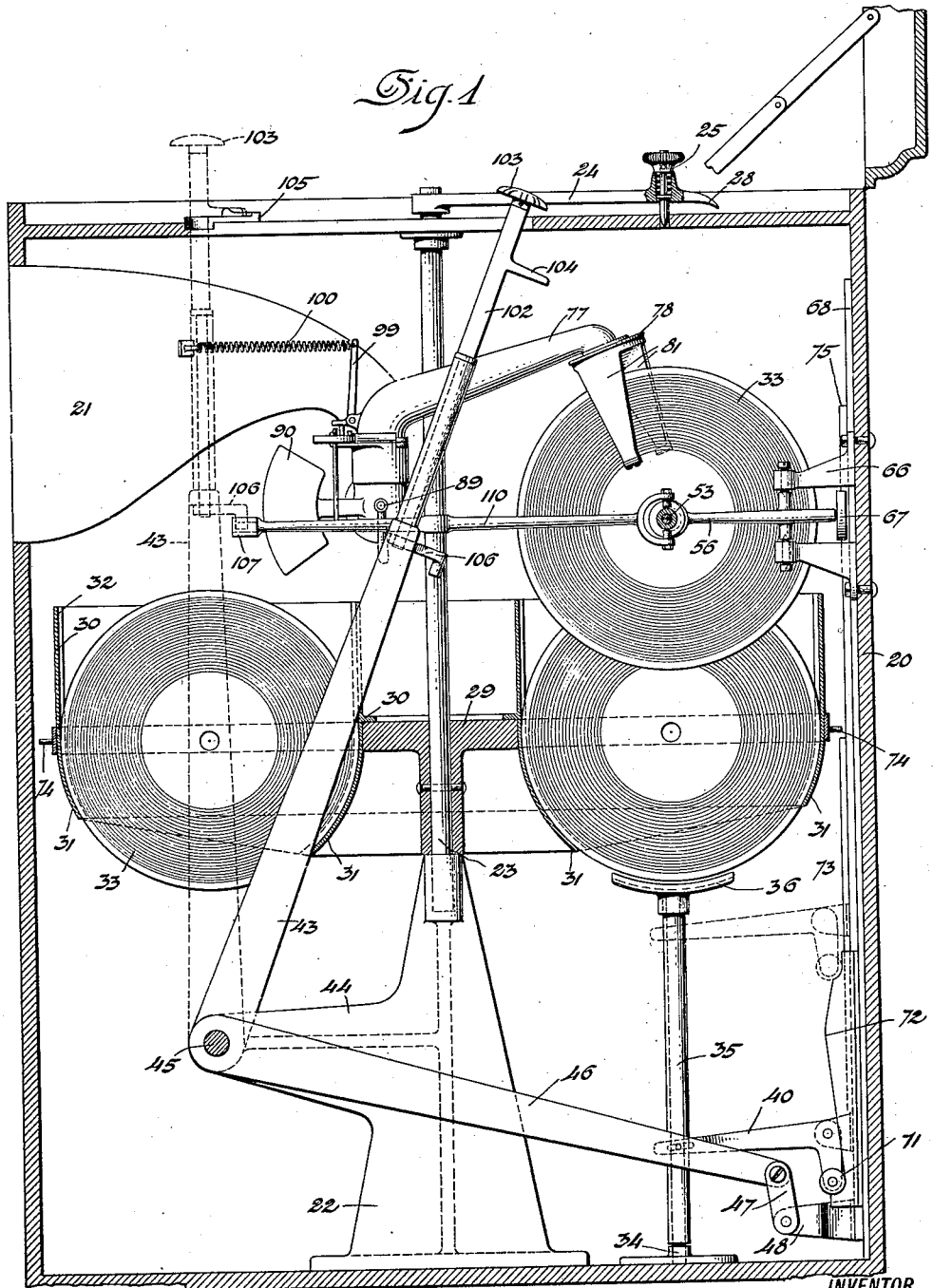
Figure 2:
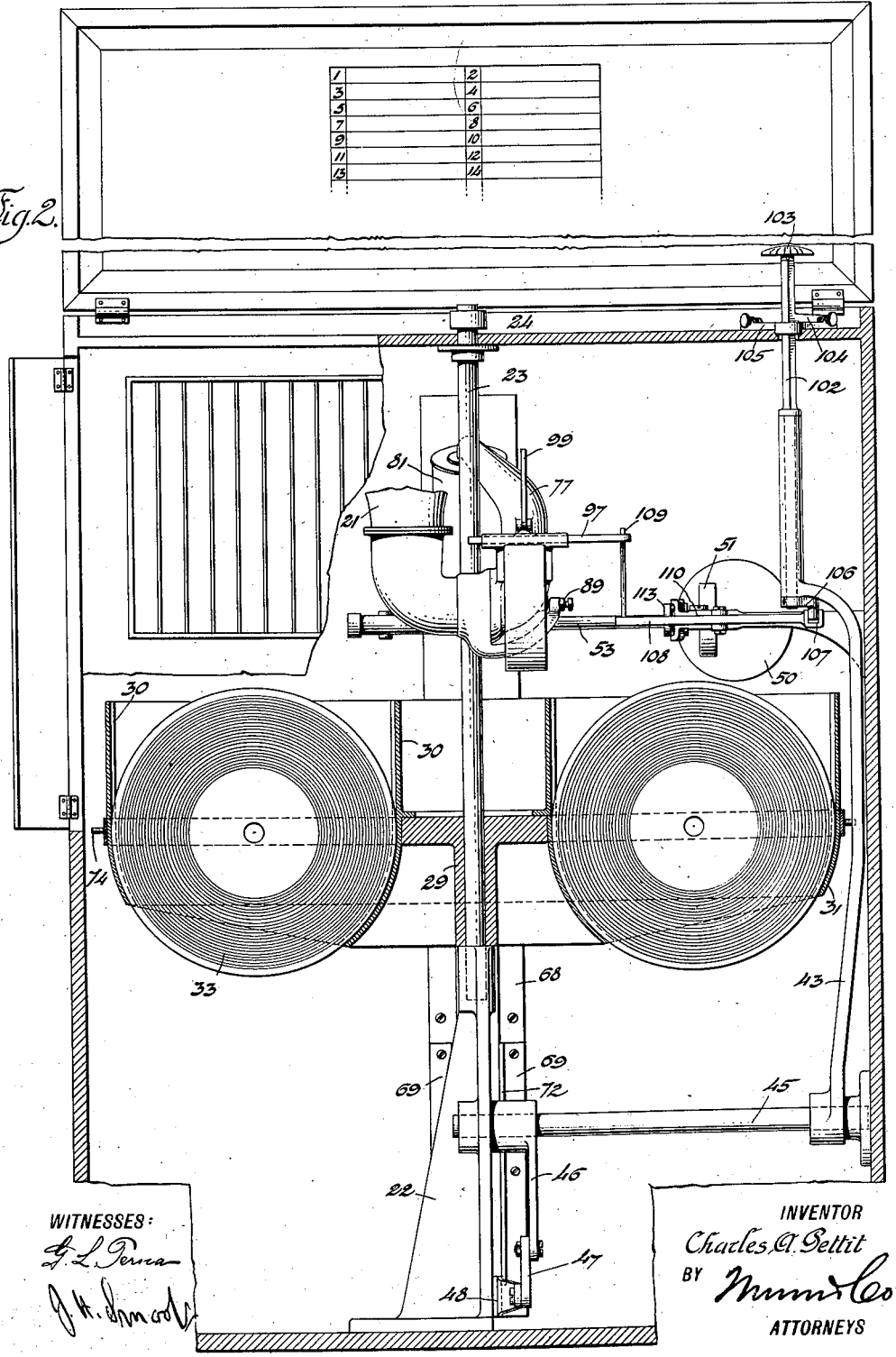
Fig. 2 is a partly sectional front view of the same.

As will be seen in Fig. 1 the magazine may be moved by means of the crank 24 so that any one record may be brought to a position directly overlying the upper face of the shoe 36. To project such shoe upwardly to permit the raising of the desired record to a point beyond the magazine, the sleeve 35 is provided with a pin 38 attention being had to Fig. 5 projecting into a slot 39 formed in the longer arm 40 of a bell crank, which is pivotally mounted as at 41 upon a slidable rod 42. The operating lever 43 has its lower end pivotally secured to an extension 44 of the base 22 as shown at 45, and such lever 43 serves to lock a second lever 46, which mounts on its upper end a link 47, one end of which is secured to a bracket 48 affixed to the lower end of the slidable rod 42.

Any suitable form of mechanical, or electrical motor 49 may be used to rotate the record disk, and this power shaft is conveniently affixed to a friction drive wheel 50 engaging with a friction driven wheel 51 slidably keyed as at 52 to a rotatable shaft 53. One end of the shaft 53 may be rotatably supported as at 54 by the cabinet 20, its opposite end being rotatably held by means of a collar such as 55, the collar being supported between the forked outer end of a lever 56. The shaft 53 has secured to its outer end, one half 57 of the clamping turn table, the opposite half 58 of which is mounted upon a rotatable centering pin 59 formed with tapered ends which are yieldingly and rotatably held in the collar 60 by means of a slidable block 61 normally pressed outwardly by means of an associated spring 62 of any desired type, a stop 63 being affixed to the pin 59 to limit its outward projection.

To operate the halves 57 and 58 of the clamping turn table, i. e. to move them toward and away from one another, the collar 55, is, as aforestated, secured to a lever such as 56, and the collar 60 has pivotally secured to it one end of each of the levers 64 and 65. All of the levers 56, 64 and 65 are pivotally secured, as has been indicated at 66, to the side wall of the cabinet 20 adjacent to which the shoe 36 lies. The levers 56 and 65 however, extend beyond their points of pivoting, and mount adjacent their inner ends, rollers such as 67.

As aforedescribed, the rod 42 is slidably mounted, and this mounting may be provided by any suitable means, such as mounting a plate 68 upon the inner face of the cabinet 20 and mounting guide strips 69 upon the face of the plate 68, which guide strips would serve as a retaining means for the rod 42. The shorter arm of the bell crank lever including the longer arm 40 has secured to its outer end a transversely extending shaft, mounting rollers such as 71. Cam tracks 72 are conveniently associated with each of the guide strips 69, and these tracks mount the rollers 71 for a purpose hereinafter more fully specified.

A slot formed by parallel strips 73 is provided upon the rod 42 which strips, when the rod is in a raised position coöperate with pins 74 arranged one adjacent each record receiving pocket upon the outer face of the annular band 30 for preventing any motion upon the part of the magazine when the rod is in raised position.

It will now be seen that upon the magazine having been so positioned that the record desired to be played is in a position directly over the shoe 36 and held in this position by means of the crank 24, that upon the operating lever 43 being pulled the lever 46 carrying with it the link 47 will be swung upwardly, and by virtue of the connection existing between the link 47 and bracket 48 the entire rod 42 will be moved bodily in an upward direction. The rod 42 carries with it the bell crank connected to the sleeve 35, and by reason of this connection, the sleeve and shoe carried thereby will be projected upwardly to move the record to be played from the position above the magazine.

The slidable rod 42 is reduced as at 75, and upon the rod moving upwardly between the rollers 67, to a point at which they are engaged by the inclined shoulders 76 extending between the enlarged and reduced portion of the rod 42, the rollers 67 will be moved in opposite directions consequently swinging the inner ends of the levers 56 and 65 outwardly which will result in an operation of the halves 57 and 58 of the clamping turn table, which will retain the record desired to be played in operated position.

It will be appreciated that the shoe 36 must be spaced from the edge of the record as the friction set up between these two members would be so great as to prevent rotation, or if the motor 49 were sufficiently strong to rotate the record, the speed of the same would certainly not be constant. Now to overcome this difficulty, the rollers 71 as has been described are mounted upon the cam tracks 72, and the bell crank member will move through the successive positions shown in full and dotted lines in Fig. 5. In other words the shoe 36 will be moved to its highest horizontal plane before the limit of upward motion of the rod 42, and the pivotal connection 41 of the bell crank thereto has been reached. This connection, as is clearly shown is caused by the peculiar construction of the cam tracks 72, and it will be appreciated that the clamping turn table will seize the record at the highest point to which it is moved, subsequent to which the rod 42 will be moved to its highest position, which will result in a slight dropping back of the shoe 36, and a consequential spacing of the same from the record 33 which will be retained as aforedescribed.

A tone arm 77 is affixed to the inner end of the amplifying horn 21, and the reproducer is associated with the outer end of such tone arm, which reproducer, reference being had to Figs. 13, 14 and 15, includes a conventional tone arm connecting plate 78 formed with an opening 79. Secured to such connecting plate 78 by any suitable means such as screws 80 is a collar 81 formed with an inwardly extending flange 82, and clamped between this flange and the inner face of the connecting plate 78 is a conventional diaphragm such as 83, having its edge bearing against a suitable rubber cushion 84. Mounted upon the outer face of the flange 82 is a vibrator bar such as 85 to which is secured the ends of a pair of transmitting rods 86, having attached to their outer ends conventional needles and needle holder 87, having suitable contact as at 88 with the outer edge of the collar member 81. Referring more particularly now to Fig. 15, it will be seen that the reproducer is so positioned upon the tone arm that the needles positioned within the needle holder 87 are arranged at an angle to the surface of the record to duplicate the position assumed by these parts in the conventional phonograph.

To counter-act the weight of the reproducer and the tone arm supporting the same, the latter is provided beyond its point of pivoting, 89, with a counter-weight 90, which serves to at all times counter-act the normal tendency of the tone arm and its associated reproducer to swing downwardly. That part of the tone arm commonly known as the goose neck to which the reproducer is fixedly secured swivels in the construction shown in Fig. 1, in a horizontal plane, and thus some means must be provided with a view of causing a positive engagement of either of the needles with the under or upper side of the record, and to accomplish this object, I associate with such goose neck, a yoke such as 91 to the outer ends of which are pivotally connected as at 92, casings 93, housing one end of plungers 94, normally tending to move outwardly by virtue of springs 95 interposed between the inner ends of the plungers, and the end wall of the casing 93. The outer ends of the plungers 94 are guided by any suitable means, such as up-struck lugs 96 provided with openings through which the ends of such plungers project. The ends of the plungers 94 bear against the outer surface of a bar 97 which is thickened so as to provide three distinct thicknesses. It will be appreciated that the reproducer will be normally held in this non-engaging or neutral position, which has been illustrated in Fig. 10, but upon the bar 97 being moved longitudinally one of the plungers 94 will move outwardly, and the second plunger will be pressed inwardly by virtue of the fact that the former plunger is pressing against the thickest portion of the bar, while the latter plunger is pressed inwardly within its casing 93, which will cause a swinging of the goose neck and result in the desired needle bearing against one of the surfaces of the record.

It will be seen however, that the outer ends of the reproducer will ride inwardly along the surface of the record by virtue of the spiral groove thereon engaged by the needle of the reproducer, and to return the reproducer to its normal position upon a cessation of playing, I pivotally mount, as at 98 a bell crank 99 upon the reproducer, and secure one of the ends of such bell crank to a spring 100, the other arm of said bell crank being engaged by an elevated surface 101 forming part of the bar 97. It will be appreciated, reference being had to Figs. 10 and 11, that the bar 97 during the non-playing position of the parts, tends to hold the tone arm in neutral position, and in this position the elevated surface of the bar 97 will engage one arm of the bell crank swinging the opposite arm of the same outwardly resulting in the tensioning of the spring 100. This tensioning on the part of the spring will cause the tone arm to be swung outwardly, but upon a movement of the bar 97 in either direction, the tension of the spring 100 will be relieved by virtue of the bell crank 99 swinging, and one needle of the reproducer will be brought into engagement with either the upper or lower surface of the record to be played according to which direction the bar 97 has been moved.

Figure 3:
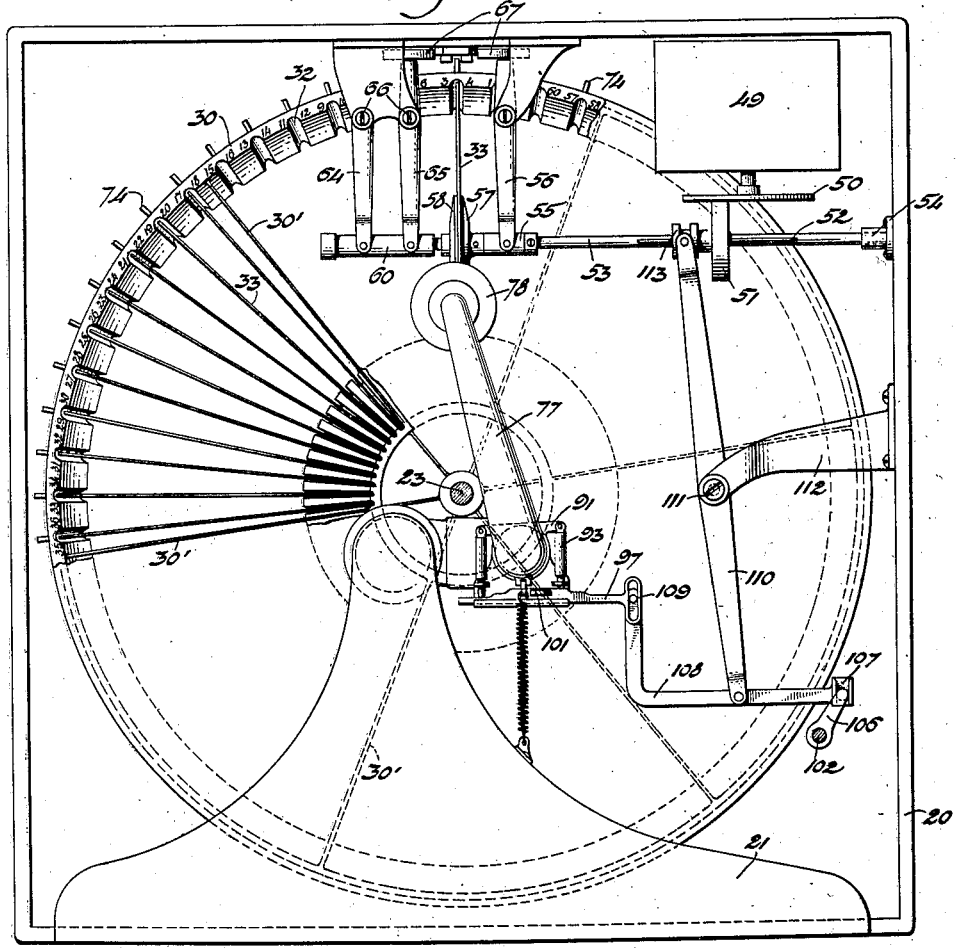
Fig. 3 is a sectional plan view.
Figure 4:
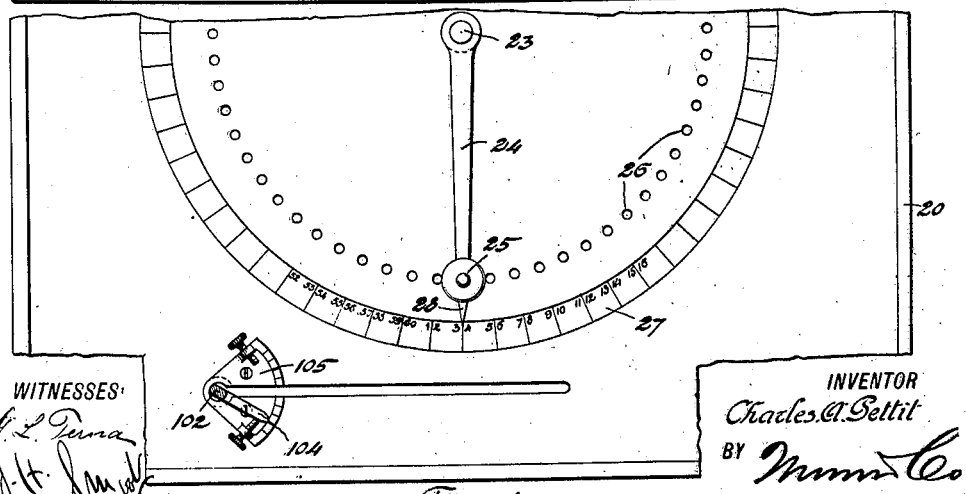
Fig. 4 is a plan view.

Now with a view of providing a speed control for the turn table, and to optionally engage either surface of the record, the upper end of the lever 43 mounts a rod such as 102, and when the lever 43 is in the position indicated in dotted lines in Fig. 1 the knurled knob 103 of the rod 102 may be rotated, and the indicating finger 104 of the same will be registered with the scale 105 provided in the deck of the cabinet 20. The rod 102 has associated at its lower end, a crank arm 106, which crank arm will lie in a plane corresponding to that of the slot 107 forming a part of the bell crank lever 108, with the lever 43, as aforestated in the position indicated in dotted lines. The engagement of the crank arm 106 with the slot 107, has been well illustrated in Fig. 3, and it will be seen that upon a turning of the knob 103 in either direction that the bell crank lever 108 will be rocked so as to cause a projection or retraction of the bar 97 by virtue of the pin and slot connection 109. The bell crank lever 108 swingingly mounts one end of lever 110, which is pivotally supported as at 111 extremely intermediate its two extremities by means of a bracket 112 projecting from the inner face of one of the side walls of the cabinet 20. The opposite end of the lever 110 is forked, and engages the collar 113 secured to the friction driven wheel 51.

It will now be understood that a slight turn of the knob 103 in either direction will result in a swinging of the tone arm 77 so that one needle of the reproducer engages with the surface of the record 33 to be played. A further turning of the knob will result in a pronounced rocking of the lever 110, and by virtue of the connection of this latter with the friction driven wheel 51 the same will be caused to slide over the surface of the driving wheel 50 resulting in an increase or decrease of speed, as is desired. It is also to be noted that when the opposite side of the record is to be played that aside from the tone arm swinging so as to cause an engagement of the second needle of the reproducer, with the opposite surface of the record that the direction of rotation of the latter is reversed by virtue of the fact that the driven wheel 51 passes through the axis of rotation of the driving wheel 50 and to the opposite side thereof.

Obviously, numerous embodiments of structure might be resorted to without departing from the scope of my claims, which read.

I claim.

1. A magazine phonograph, including a magazine adapted to receive records, means for moving one of said records out of said magazine, means for bringing the reproducer to bear against either surface of said record, and means for rotating such record.

2. A magazine phonograph, including a magazine adapted to receive records, means for moving one of said records out of said magazine, means for bringing a single reproducer to bear against either surface of said record, and means for rotating such record.

3. A magazine phonograph, including a magazine adapted to receive records, means for moving one of said records out of said magazine, means for bringing a single reproducer provided with a plurality of reproducing points to bear against either surface of said record, and means for rotating such record.

4. A phonograph, including a magazine, means for moving one of the said records from such magazine, a clamping turn table adapted to subsequently receive said record, means for rotating such turn table, and means for causing said record moving means to move out of engagement with said record subsequent to the turn table receiving the same, and a reproducer adapted to bear against either of the surfaces of the said record.

5. A phonograph, including a turn table adapted to receive a record and to rotate the same, a single reproducer provided with a plurality of reproducing points, a single tone arm mounting such reproducer, and means for moving such tone arm so as to cause engagement between either of the surfaces of the said record and reproducing points.

6. A phonograph, including a turn table adapted to receive and retain a record, a driving shaft for said turn table, a reproducer adapted to engage either surface of said record, and common means for varying the speed of said driving shaft and bringing said reproducer to bear against either of said record surfaces.

7. A phonograph, including a magazine adapted to receive a variety of records, means adapted to move one of said records from said magazine, and means for rotating said record, a reproducer, and means for moving said reproducer to bear against either of the surfaces of the record to be played.

8. A phonograph, including a magazine adapted to receive a variety of records, means adapted to move one of said records from said magazine, and means for rotating said record, a reproducer, and means for moving said reproducer to bear against either of the surfaces of the record to be played, and for varying the speed of the record rotating means.

9. A phonograph, including a magazine adapted to receive a variety of records, means adapted to move one of said records from said magazine, and means for rotating said record, a reproducer, and means for moving said reproducer to bear against either of the surfaces of the record to be played, and for reversing the direction of rotation of said record rotating means.

10. A phonograph, including a magazine adapted to receive a variety of records, means adapted to move one of said records from said magazine, means for rotating said record, a reproducer adapted to bear against one of the surfaces of said record, and means associated with said record moving means for moving said reproducer to bear against either of the surfaces of the record to be played, and for reversing the direction of rotation, and varying the speed of said record rotating means.

11. A phonograph, including a turn table adapted to receive a record, means for rotating such turn table, a single reproducer adapted to bear against said record, a single swivel tone arm attached to such reproducer and a counter-weight attached to said tone arm beyond the point of swiveling.

CHARLES ALFRED PETTIT.